Feb. 16, 1971  F. A. BURKE ETAL  3,563,645
COMPACT MICROFILM READER
Filed March 13, 1969  2 Sheets-Sheet 1
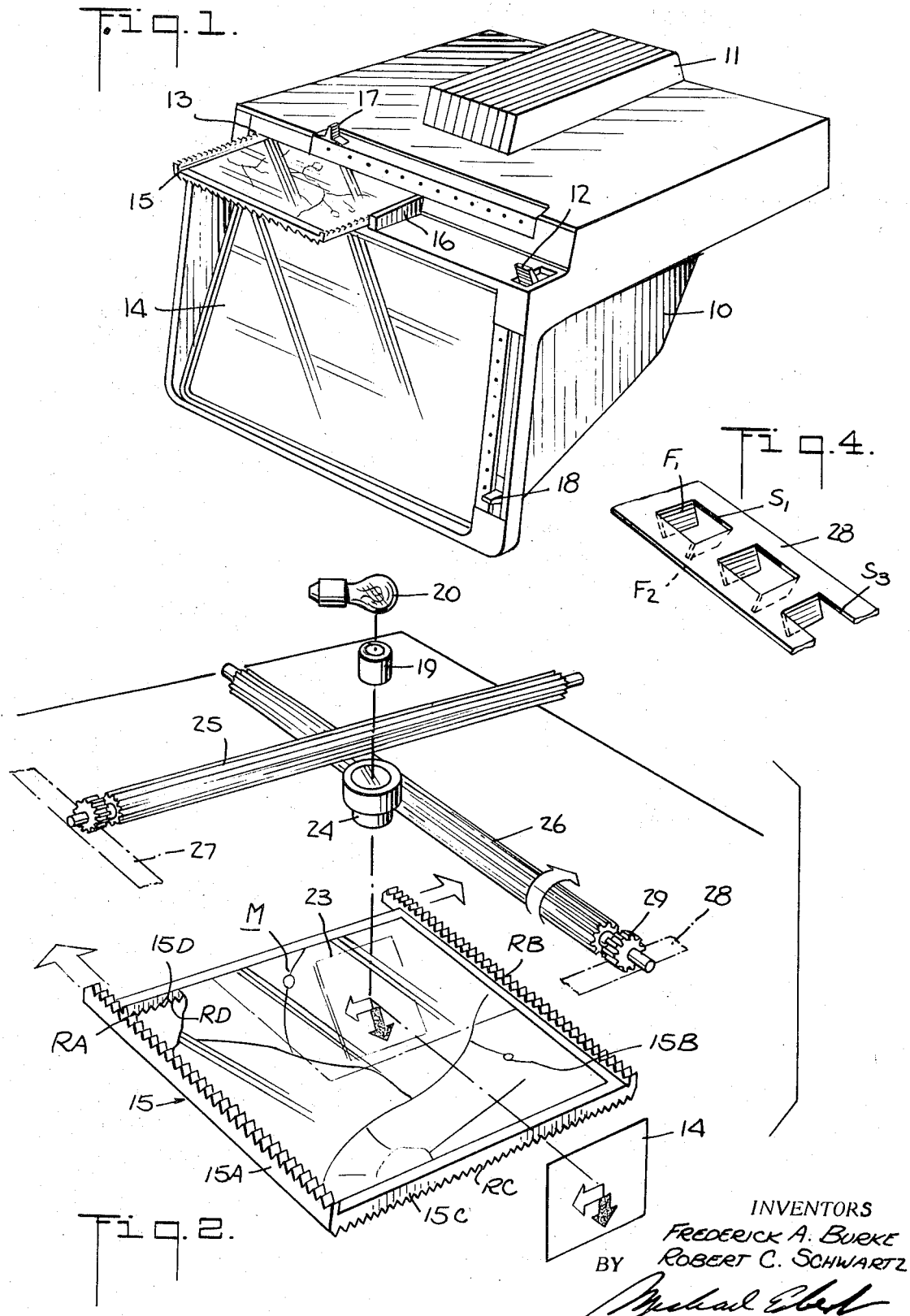
INVENTORS
FREDERICK A. BURKE
ROBERT C. SCHWARTZ
BY
ATTORNEY

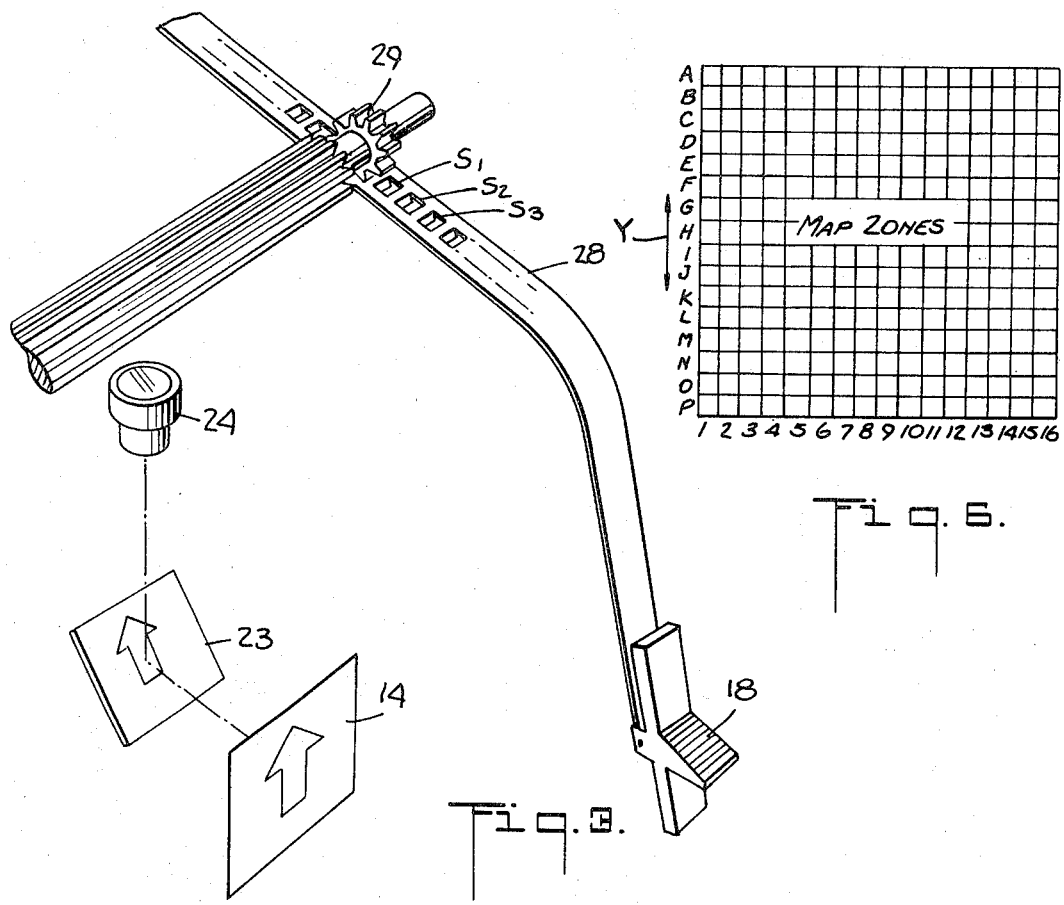
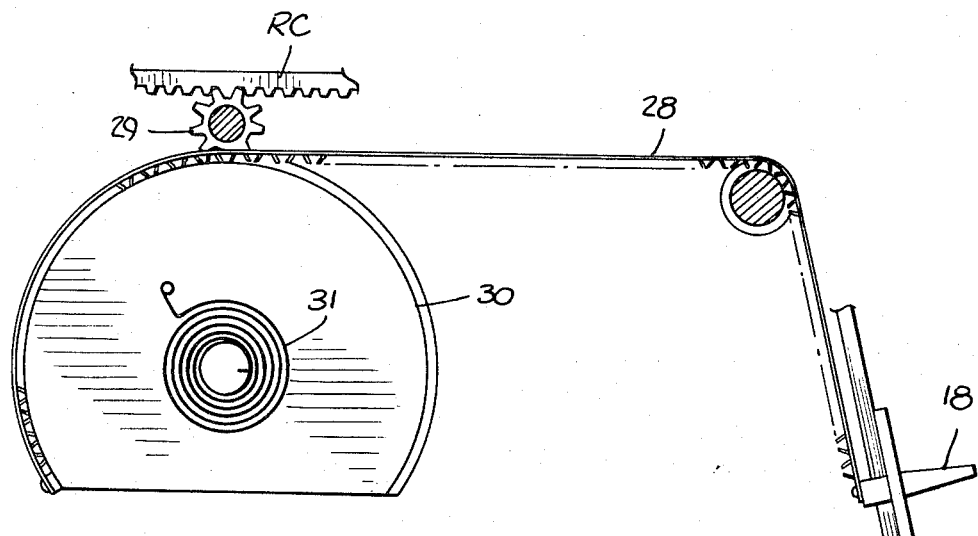

United States Patent Office 3,563,645
Patented Feb. 16, 1971

3,563,645
COMPACT MICROFILM READER
Frederick A. Burke, Mamaroneck, and Robert C. Schwartz, Jamaica Estates, N.Y., assignors to Motiva Ltd., Jamaica Estates, N.Y., a corporation of New York
Filed Mar. 13, 1969, Ser. No. 806,910
Int. Cl. G03b 23/08
U.S. Cl. 353—27
9 Claims

ABSTRACT OF THE DISCLOSURE

A microfilm reader adapter to project selected zones or frames of a microfilm record containing a greatly reduced image of a large map or other data, or an array of microfiche frames. The record to be projected is laminated to or printed on the transparent window of a rectangular carrier which is shiftable in X and Y coordinates with respect to the optical axis of an optical projection system arranged to concentrate light on a limited zone or frame on the record. The carrier is insertable between two pinions rotatably mounted at spaced positions at right angles to each other, the upper pinion engaging racks formed on the top face of one pair of parallel sides of the carrier, the lower pinion engaging racks formed on the under face of the other pair of parallel sides. Indexing means are provided to rotate the pinions and thereby incrementally shift the carrier to a position aligning a selected zone or frame on the record with the optical system.

RELATED APPLICATION

Ser. No. 734,978, filed June 6, 1968, by Robert C. Schwartz.

This invention relates generally to optical projectors for viewing transparent microfilm records, and more particularly to a microfilm reader which is adapted to cast an illuminated enlargement of a selected zone or frame of a microfilm record on a screen, whereby the operator is able conveniently to study particular zones or frames of interest in any desired sequence.

Conventional road maps of the type commonly used by automobile drivers are printed on large paper sheets. The usual state highway map is scaled to about one inch per ten miles; hence to cover a longitudinal distance of four hundred miles, the map must be at least forty inches in length. For convenience, vehicular road maps are accordion-folded, each panel of the folded map containing only a small portion of the total geographic area covered by the map.

When the standard road map is put to use, the driver must first unfold the map and then refold it to expose the area of immediate interest. In the course of travel, as the driver approaches the boundaries of the exposed area, the map must again be unfolded and refolded to permit the driver to consult a new area. Moreover, while a given panel of the map may include a region of particular interest to the driver, this region may be buried within a larger area of lesser interest. In a complex map, it may be difficult for the driver to extract the information he requires.

The driver not only is forced to struggle with an unwieldy map in the small confines of his vehicle, but he also has the problem of map visibility. At night or when the light within the vehicle is poor, illumination is necessary to read the map. One cannot safely turn on the interior light for this purpose while the car is in motion, for this may interfere with the ability of the driver to see the road clearly. Some vehicles are provided with map lights which throw their concentrated rays under the dashboard. This introduces a further inconvenience, for then the map becomes readable only by placing the map below the dashboard and bending down to read it.

Similar problems are encountered with nautical and flight maps and charts, for when piloting a vessel or an airplane, the present practice, which involves the use of large, unwieldy sheets, makes it difficult for the navigator to quickly consult a particular zone of interest.

In view of the foregoing, it is the main object of this invention to provide a microfilm reader operating in conjunction with a microfilm record having a reduced image thereon of a large map or other forms of intelligence, the reader being adapted to cast onto a screen an illuminated enlargement of a selected zone of the image, whereby the user is able conveniently to study particular zones of interest in a sequence under his control.

More specifically, an object of the invention is to provide a microfilm reader of the above-described type, wherein the microfilm record is borne by a carrier whose position may be indexed in both longitude and latitude, or in east-west and north-south directions, to align any zone of the microfilm map with an optical projector, whereby a selected zone is cast on a screen.

While the invention will be described herein mainly in connection with vehicular road maps, it will be appreciated that the optical reader may also be used in conjunction with microfiches wherein an array of separate microfilm frames is contained on a common record, each frame constituting an intelligence zone of interest. The optical reader is also useful in conjunction with large nautical and flight maps, these maps being reduced to the size of a microfilm record.

For a better understanding of the invention, as well as other objects and further features thereof, reference is made to the following detailed description to be read in conjunction with the annexed drawing, wherein:

FIG. 1 is a perspective view of a microfilm reader in accordance with the invention;

FIG. 2 is a perspective view, partially schematic in form, showing the internal structure of the reader;

FIG. 3 shows the indexing arrangement for one of the pinions;

FIG. 4 is an enlarged view of the indexing strap;

FIG. 5 illustrates the mounting of one of the straps; and

FIG. 6 is a grid showing how the microfilm record is effectively divided into zones.

Referring now to FIG. 1, there is illustrated a preferred embodiment of a compact microfilm reader in accordance with the invention, the reader being housed in a casing 10 having a ventilated compartment 11 which contains an electric light bulb providing the light source of an optical projection system, the bulb being turned on or off by a switch 12.

Insertable within a slot 13 in casing 10 disposed above a slightly inclined viewing screen 14 on the front panel is a carrier 15 bearing the microfilm record to be projected. The carrier is slidable against a guide wall 16 to ensure it proper insertion. When fully inserted, carried 15 is engaged by pinions (to be later described) which act to shift the carrier in the X and Y coordinates with respect to the optical axis of the projection system to align a selected zone or frame of the record therewith and to thereby project the selected zone in an enlarged scale on screen 14. Positioning of the carrier in the X direction is effected by a finger piece 17 movable in a slot in the horizontal plane and in the Y direction by a finger piece 18 movable in a slot in the vertical plane.

Referring now to FIG. 2, the internal structure of the reader is shown, the carrier 15 being shiftable with respect to the optical axis Z of the projection system wherein a condenser 19 serves to concentrate light from a bulb 20 onto a limited area of a microfilm record M printed on or laminated to the transparent window 21 of carrier 15. The illuminated image is cast on a reflector 23 by projector lens barrel 24, the image in the reflector being optically reversed by the lens system and being directed toward screen 14.

In practice, the microfilm record M may take the form of a four-by-four inch microfilm sheet upon which a map image is printed in a twenty-times reduction from the original scale. If, therefore, a four-inch dimension is equivalent to eighty inches, the 4" x 4" microfilm map is tantamount to a huge map of almost seven feet square. As pointed out previously, normal state highway maps are scaled at about one inch to ten miles, so that eighty inches would, for example, cover an area encompassing New York to Chicago and Washington, D.C. to Quebec. In this way, the entire United States could be covered in eight such 4 x 4 inch microfilm maps.

Lare metropolitan areas could be covered in a much larger scale to make it possible to view house numbers. At one inch per one-quarter mile, or five city blocks, an 80 x 80 inch map would cover twenty square miles and this could be reduced to a 4 x 4 inch image on a single microfilm card. It will be appreciated that the invention is by no means limited to the sizes given above by way of example.

In the instrument disclosed herein, the 4 x 4 inch microfilm map is effectively divided into 256 square zones, each one-quarter inch square. This is accomplished by sixteen positions, 1 to 16, as shown in FIG. 6, on the X axis, or east-west direction, and sixteen positions, A to P, on the Y axis or north-south direction. The choice of a particular zone is determined in rectangular coordinates by a selected combination of X and Y numbers and letters effected by the indexing system.

While each zone on the microfilm card is one-quarter inch square, the system is preferably such as to provide an illuminated enlargement on screen 14 of twenty-five square inches, the slight overspill of one-half inch on all four edges helping to maintain continuity between sequentially projected zones.

Thus in operation, the user shifts both the fingerpieces 17 and 18 in order to align a given zone with the optical projector system, and if the driver is to travel, say, north, he manipulates the finger-piece 18 down-screen to reveal successive zones in the northerly direction, or if he is traveling south, he manipulates finger-piece 18 up-screen. But if the travel is east-west, it is finger-piece 17 which is used to shift the projected image in these directions to present the appropriate zones in the course of travel.

In practice, the optical projector may include a zoom lens system to enable quick reference to particular locations, as well as colored lens filters. In the case of filters, the microfilm map is so multicolored that the color corresponding to the filter color is effectively excluded, while the others pass through and are presented. For example, by printing state highways in red, federal highways in green, and local roads in orange, one may, by the use of a red filter give the presented image a red background, in which situation the state highways printed in red are not discernable. Thus only information printed in colors other than red is visible on the screen.

Screen 14 is made of a light-permeable material which may be an acrylic or glass adapted to receive temporary grease or other markings to delinate preferred roads, the markings being erasable. A range-finder may also be incorporated to determine distances quickly.

In carrier 15, the transparent window is framed by four side pieces, 15A, 15B, 15C and 15D. The upper faces of parallel side pieces 15A and 15B have racks RA and RB formed therein, while the bottom faces of parallel side pieces 15C and 15D have racks RC and RD formed thereon. In practice, the entire carrier structure may be molded in one piece.

When the carrier is fully inserted in the reader, racks RA and RB are engaged by an elongated pinion 25 whose teeth extend longitudinally and intermesh with the complementary teeth of the racks. At the same time racks RC and RD are engaged by an elongated pinion 26 whose longitudinally extending teeth intermesh with the teeth of the racks, pinion 26 being perpendicularly disposed with respect to pinion 25.

Thus rotation of pinion 25 advances carrier 15 in the X direction and rotation of pinion 26 advances carrier 15 in the Y direction whereby by an adjustment of these pinions, one may align a particular zone on the microfilm record with the optical axis Z of the projection system. The pinions may be directly rotated by dials coupled thereto.

Preferably, pinion 25 is rotated by means of a spring steel strap 27 coated with Teflon on both faces to reduce friction, which strap is advanced in a suitable track in either direction by finger piece 17 connected thereto, while pinion 26 is similarly rotated by means of a spring steel strap 28, to which finger piece 18 is coupled.

As best seen in FIG. 4, which shows only straps 28, each strap has sprocket holes $S_1$, $S_2$, $S_3$, etc. punched out therein, the punched out portions of each hole forming a pair of spring fingers such as $F_1$ and $F_2$. The strap engages a sprocket wheel 29 at the end of pinion 26, which wheel may be defined by a gap adjacent the end of the pinion to create a sprocket. The sprocket teeth enter the sprocket holes of the strap, the spring fingers serving to prevent play between the holes and teeth.

As will be seen in FIG. 5, one end of strap 28 is attached to a partial gear 30 which is loaded by a spiral spring 31 to maintain the strap under tension.

In order ot effect a stepwise movement of fingerpieces 17 and 18 so that the image presented on the screen indexes or shifts incrementally from zone to zone, a detent strip may be provided adjacent the slots shown in FIG. 1, along which the finger-pieces are movable. The detents in the strip are so spaced as to hold the pieces at points at which the zones are properly registered on the screen. When the same reader is to be used with microfiche records rather than microfilm maps, the detent strips are replaced with others having detent increments appropriate to the image positions on the microfiche.

It is to be noted that a movement of finger 18 down screen 14 is a movement toward the south on the screen, whereas the microfilm map on carrier 15 is actually moving in the north direction. Similarly, when finger piece 18 is moved toward, say, the left or in the west direction on the screen, carrier 15 is then shifted toward the right or the east direction. However, the optical projector acts to reverse the map image presented on the screen, so that the direction taken by the map as seen on the screen corresponds with the direction of adjustment in the X and Y axes made by the operator.

It will be appreciated that the carrier and microfilm record thereon constitute a replaceable element which may be fabricated at low cost, so that a library of such elements may be provided to be used with the reader.

What we claim is:

1. A microfilm read for projecting, in any desired sequence, selected zones of a microfilm record containing a greatly reduced image of a large map or other forms of intelligence onto a screen, said reader comprising:
    (a) a rectangular carrier having a transparent window containing said record, said window being framed by four side pieces, one parallel pair of pieces having a first set of racks formed on the upper face thereof, the other parallel pair having a second set of racks formed on the under face thereof,
    (b) an optical projector for illuminating a small area of said record and for projecting an image thereof on said screen, said projector having an optical axis,
    (c) a mechanism to shift said carrier in mutually perpendicular directions relative to said optical axis to align a selected zone therewith, said mechanism including a first pinion engaging said first set of racks and a second pinion engaging said second set of racks and disposed at right angles to said first pinion, and first and second adjustable means to separately rotate said first and second pinions to adjust the position of said carrier to a selected position.

2. A reader as set forth in claim 1, wherein said record is a film sheet laminated to said window.

3. A reader as set forth in claim 1, wherein said record is printed directly on said window.

4. A reader as set forth in claim 1, wherein said carrier is formed of acrylic material.

5. A reader as set forth in claim 1, wherein said first means is provided with a finger-piece movable along one side of the screen and said second means is provided with a finger-piece movable along a side of the screen normal to the one side thereof.

6. A reader as set forth in claim 1, wherein said mechanism is adapted to shift the carrier and the map thereon in a reverse compass direction, and said projector reverses the image of the map on the screen.

7. A reader as set forth in claim 1, wherein said screen is light-permeable and lies at an incline relative to the vertical plane, and said carrier lies in a horizontal plane, said optical projector being disposed along a vertical axis, and further including a reflector to direct the image projected by said projector onto said screen.

8. A reader as set forth in claim 7, wherein said projector includes a condenser lens barrel disposed above the carrier and a projection lens disposed therebelow.

9. A reader as set forth in claim 1, wherein said first and second adjustable means each includes a strap having sprocket holes engaging a sprocket portion of said first and second pinion respectively.

References Cited
UNITED STATES PATENTS

| | | | |
|---|---|---|---|
| 3,361,031 | 1/1968 | Stroud | 353—27 |
| 3,472,585 | 10/1969 | Halberg et al. | 353—27 |
| 3,446,552 | 5/1969 | Gross et al. | 353—27 |

HARRY N. HAROIAN, Primary Examiner

U.S. Cl. X.R.

353—77